United States Patent [19]

Fuller

[11] Patent Number: 5,457,886

[45] Date of Patent: Oct. 17, 1995

[54] METHOD OF MAKING A WHEEL COVER SIMULATING ALUMINUM WHEEL SCULPTURE

[75] Inventor: Everett Fuller, Orange, Calif.

[73] Assignee: Coyote Enterprises, Inc., Anaheim, Calif.

[21] Appl. No.: 239,567

[22] Filed: May 9, 1994

[51] Int. Cl.⁶ .................................................. B21K 1/28
[52] U.S. Cl. ........................ 29/894.381; 29/894.38; 301/37.1
[58] Field of Search .................... 29/894.38, 894.381; 301/37.1, 37.24, 37.31, 37.32, 37.35, 37.36, 37.42

[56] References Cited

U.S. PATENT DOCUMENTS

| | | | |
|---|---|---|---|
| 1,976,542 | 10/1934 | Clarke . | |
| 2,110,808 | 3/1938 | Miller | 301/37.1 |
| 2,127,600 | 8/1938 | Hunt | 301/37.1 |
| 3,095,241 | 6/1963 | Fitzgerald . | |
| 3,432,206 | 3/1969 | Spisak | 301/37.1 |
| 3,496,753 | 2/1970 | Gibbings . | |
| 3,726,566 | 4/1973 | Beith | 301/37.1 |
| 3,798,728 | 3/1974 | Beisch . | |
| 4,787,681 | 11/1988 | Wang et al. . | |
| 5,100,206 | 3/1992 | Feng | 301/37.1 |

*Primary Examiner*—P. W. Echols
*Attorney, Agent, or Firm*—Fulwider Patton Lee & Utecht

[57] ABSTRACT

A wheel cover simulating a machined cast wheel is constructed by stamping a blank from sheet metal. Windows spaced angularly about the cover defined by radially inwardly angled borders simulating depth are formed on the blank. A marginal circular periphery is formed into a peripheral flange. The front face of the wheel cover is machined on a numerically controlled lathe, such that the cutting tool closely follows the contour, to form fine spiral grooves simulating machine markings generally concentric about the center of the wheel, thereby exhibiting a machined finish. A retainer ring is mounted interiorly within the flange and the flange rolled thereover to complete the assembly. This configuration provides a relatively inexpensive decorative wheel cover simulating a machined wheel.

11 Claims, 4 Drawing Sheets

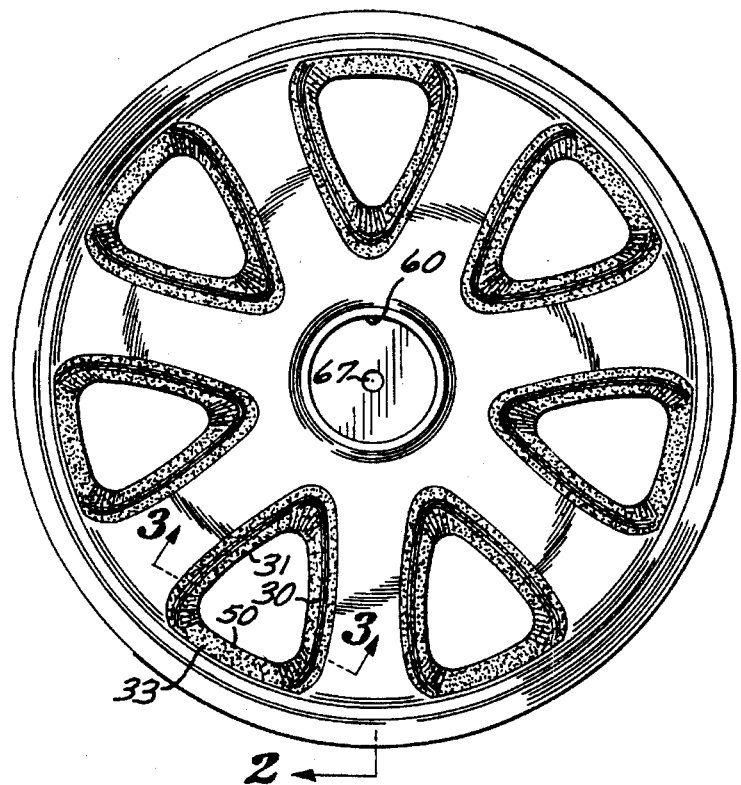
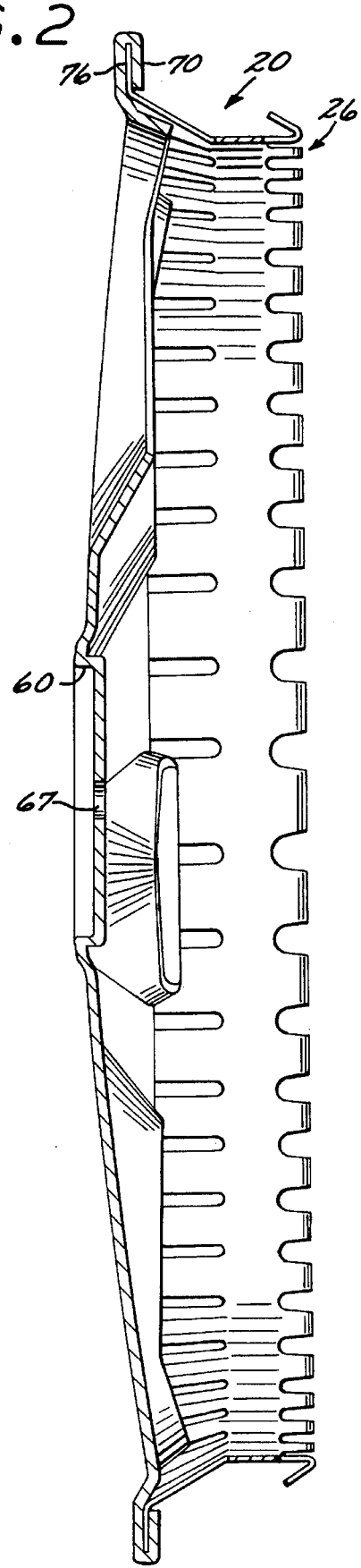
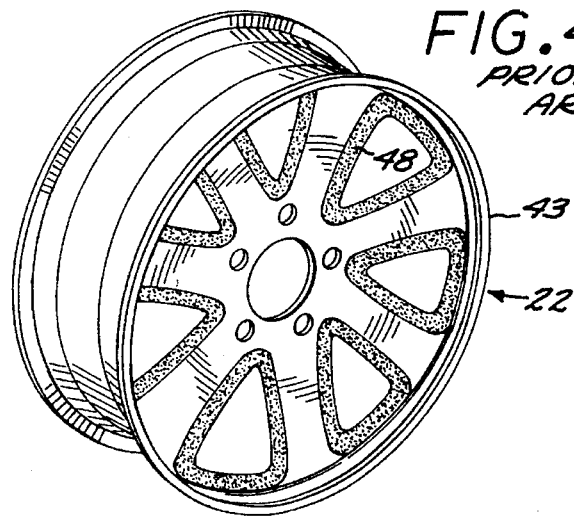
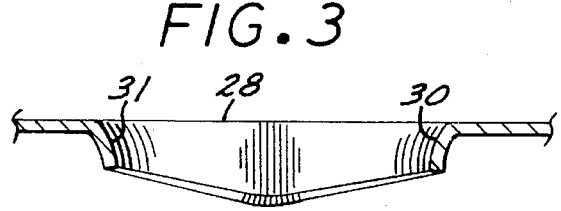
FIG. 1
FIG. 2
FIG. 4 PRIOR ART
FIG. 3

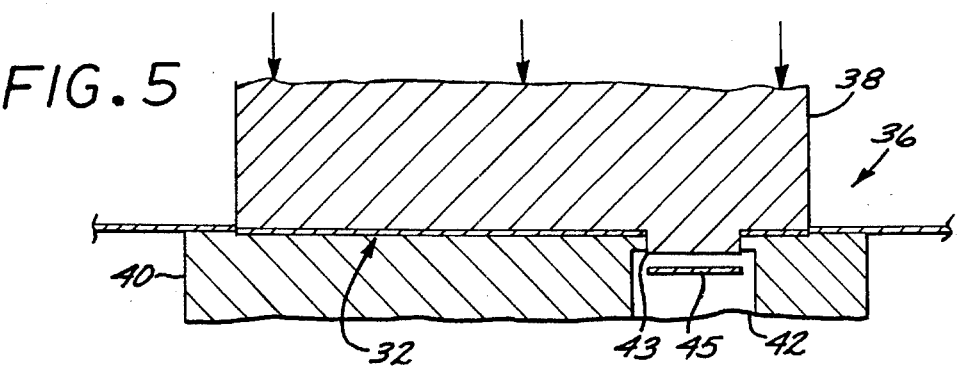
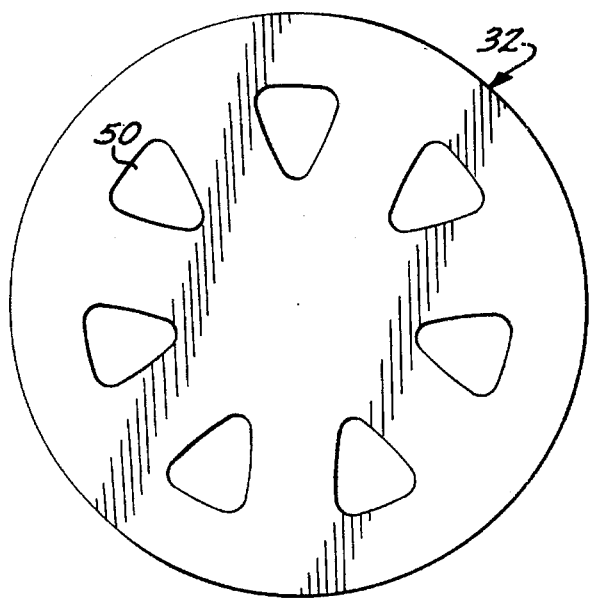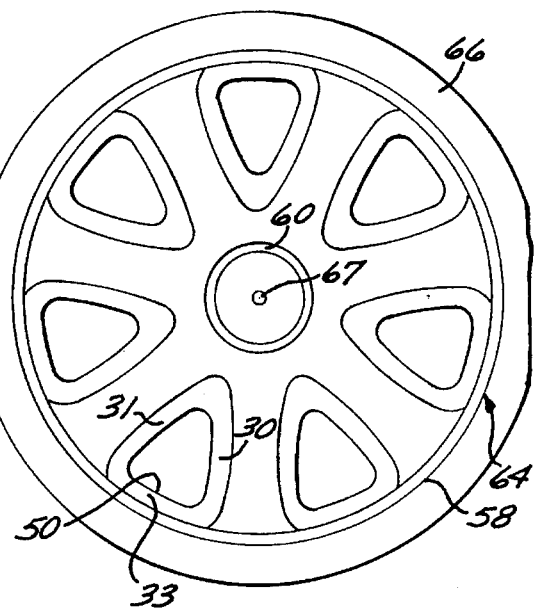
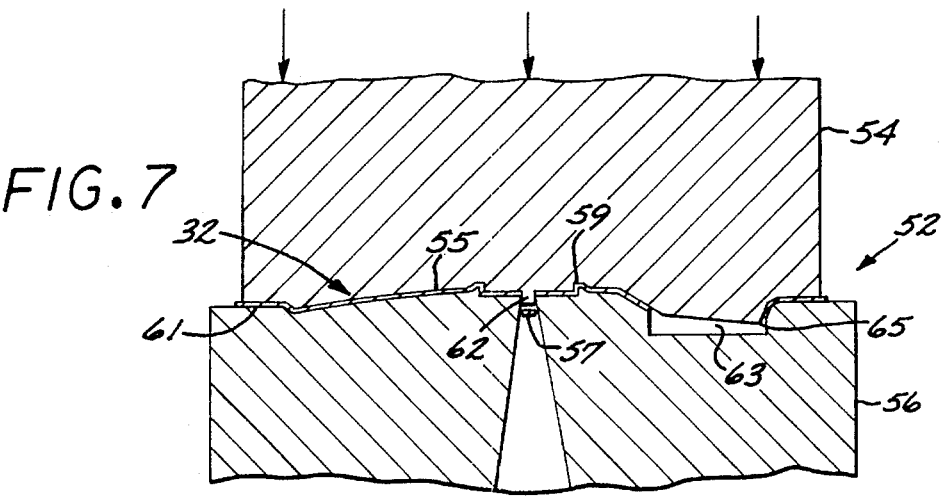

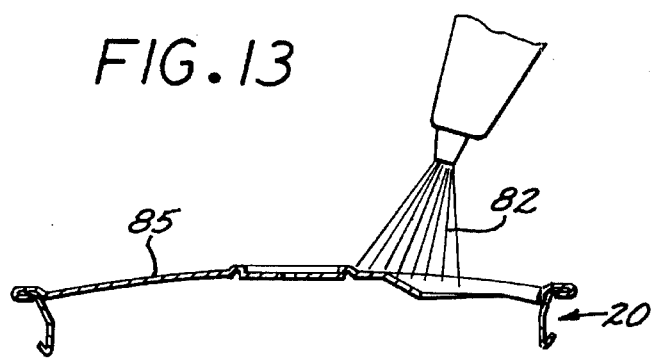
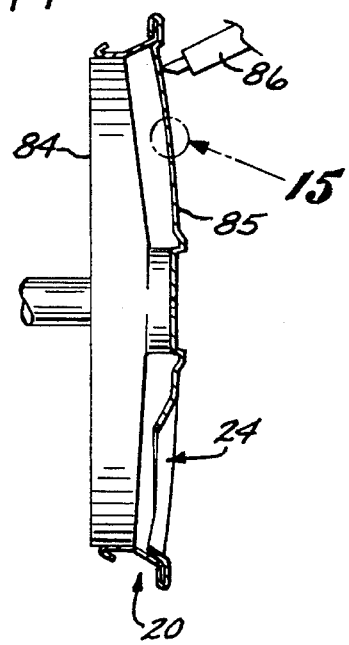
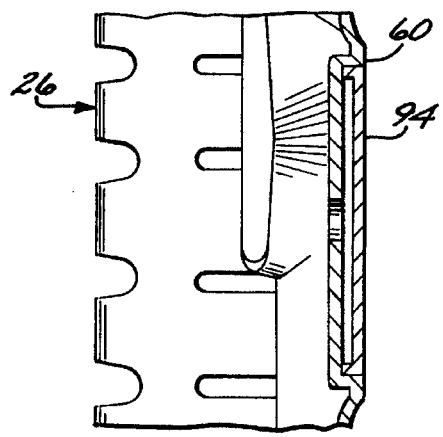
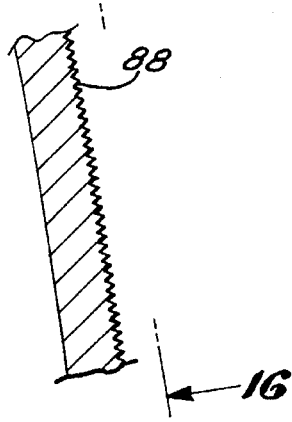
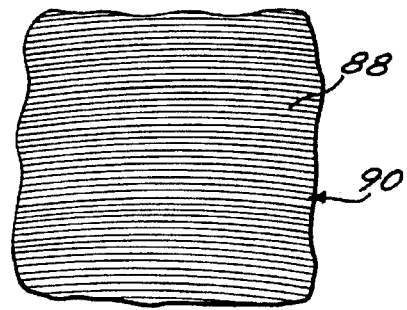

METHOD OF MAKING A WHEEL COVER SIMULATING ALUMINUM WHEEL SCULPTURE

BACKGROUND OF THE INVENTION

1. Field of the Invention

The present invention relates to a method of manufacturing an aluminum wheel cover to mount on a steel wheel to simulate a machined case aluminum wheel.

2. Description of the Prior Art

Efforts have been made in the past to improve the appearance of original equipment automotive steel wheels. Such attempts have included colorizing or coating the wheel, physically augmenting the wheel, affixing a hub cap or wheel cover on the wheel, adding trim to the wheel, and replacing the wheel itself.

Conventional OEM steel wheels can be painted or plated to enhance their appearance. These methods require considerable effort and have a limited result in enhancing the overall appearance of such wheels.

Other efforts to improve the appearance of a conventional wheel have led to the attachment of an exterior plate or a series of plates by mounting them from the lugs. Such plates are intended to increase the width of the wheel making it appear more massive. U.S. Pat. No. 4,787,681 describes such an apparatus.

Further efforts to camouflage the appearance of a rudimentary automobile wheel have led to the incorporation of a cap or cover. Such caps can be plastic, metal, or wire spoked. The plastic caps are typically formed by injection molding. The metal caps are formed by casting or a blanking and drawing operation. U.S. Pat. Nos. 1,976,542, 3,095,241, and 3,496,753 show examples of wheel caps and covers and the method of making them. Such caps or covers often suffer the shortcoming that they present little more than surface decoration providing little in the way of optical illusion persuasive of a faithful reproduction of a cast wheel.

It has also been proposed to add wheel trim to a rudimentary wheel or to a hub cap mounted on a wheel. The wheel trim is often employed in an effort to make the hub cap or wheel appear wider and can be configured to obscure from view the junction between the tire and the wheel. U.S. Pat. No. 3,798,728 suggests such an approach.

Often consumers are driven to replace the entire wheel in a quest for stylish transport. Previous solutions in the nature of augmenting the wheel sometimes presented a flimsy and visually unappealing wheel design. Thus, various forms of decorative automobile wheels themselves have been proposed. Aftermarket automobile wheels are typically cast aluminum or stamped and rolled steel wheels. For the cast aluminum wheel, the surface to be exposed to view is machined with a lathe cutting tool to remove rough edges and provide a smooth texture and luster. The lathing process leaves spiral markings indicative of the process. A machined cast wheel has a unique appearance that is valued by consumers. Consumers desire a machined appearance.

Decorative machined wheels, however, are expensive to manufacture and finish. The cost of making even the least expensive decorative machined cast wheel can be four times that for steel wheels augmented by other methods appearance augmentation, such as wheel covers. Decorative automobile wheels are also bulky, heavy, and cumbersome to package and transport to retail outlets.

Thus, consumers are faced with the choice of an expensive machined cast wheel or less expensive, though less attractive, devices. These less expensive devices do not have the improved appearance resulting from the machining process. They lack the high quality appearance that consumers normally associate with a high-end machined cast aluminum wheel.

Ordinary wheel covers have not achieved a resemblance to quality machined wheels that would give a consumer an inexpensive alternative to expensive cast machined wheels.

SUMMARY OF THE INVENTION

The invention provides an inexpensive method for simulating a machined cast wheel or a steel wheel. A machined wheel is simulated by incising a round blank from a stock of sheet metal. After an initial forming process, sections of the blank are removed across the surface of the blank at spaced intervals to form windows positioned in a pattern and configured to, when the edges thereof are formed to bend radially inwardly, present an appearance simulating that of a spoked wheel. The blank is formed to create indentations around each window giving the appearance of depth. A margin on the periphery of the blank is turned back to form a peripheral retaining flange. A conventional annular retaining ring is telescopically inserted against the inner surface of the peripheral flange. The peripheral flange is bent over a retention bead on the ring to hold the ring in position. The blank is painted to simulate contour and depth. A lathe cutting tool is used to machine the outer side of the blank and the outer surface of the peripheral flange forming spiral grooved markings thereon to simulate the appearance of a machined cast aluminum wheel. The cutting tool closely follows the contours of the blank making a single pass across its surface. This precision is achieved by a numerically controlled (CNC) lathe system. The resultant wheel cover assembly is clear coated with a sealant and a logo may be attached at the center. The cover then provides a three dimensional appearance which, even at a relatively modest cost of manufacture, effects an appearance closely simulating that of an expensive cast wheel.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1 is a front view of a wheel cover assembly manufactured in accordance with the method of the present invention and simulating a machined wheel;

FIG. 2 is a cross-sectional view, in enlarged scale, taken along the line 2—2 of FIG. 1;

FIG. 3 is a cross-sectional view, in enlarged scale, taken along the line 3—3 of FIG. 1;

FIG. 4 is a perspective view of a cast machined wheel to be simulated by the cover assembly shown in FIG. 1;

FIG. 5 is a cross-sectional view of a die set blanking a sheet of metal in a process for making the wheel cover assembly shown in FIG. 1;

FIG. 6 is a plan view of the blank formed by the step shown in FIG. 5;

FIG. 7 shows a die set performing a drawing operation on the blank shown in FIG. 6;

FIG. 8 is a front view of a blank formed by drawing operation steps shown in FIG. 7;

FIGS. 9–14 are sectional views of the blank shown in FIG. 8 as it progresses through forming steps of the present invention;

FIG. 15 is a detailed view, in enlarged scale, taken from the circle shown in FIG. 14;

FIG. 16 is a partial front view taken along the line 16—16 in FIG. 15; and

FIG. 17 is a partial cross-sectional side view, in enlarged scale, similar to FIG. 16.

DESCRIPTION OF THE PREFERRED EMBODIMENT

Figure 9:
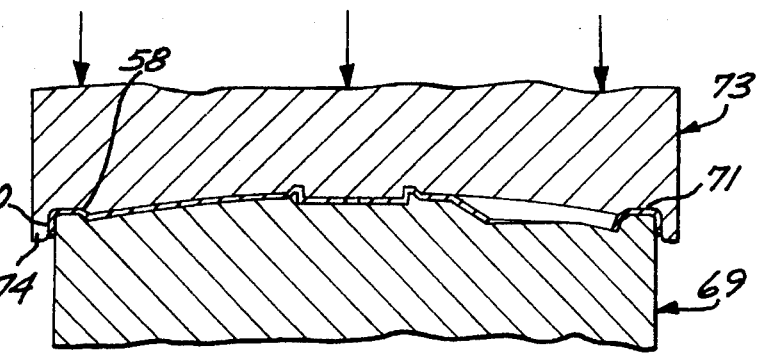

As shown in the drawings for purposes of illustration, the invention is embodied in a wheel cover simulating a machined wheel and a method of manufacturing. An inexpensive wheel cover can be made to have the same appearance as an expensive, high quality machined cast wheel. The wheel cover is formed from a circular blank of sheet metal. The wheel cover surface is stamped to create a circular pattern of indentations and apertures configured to cooperate in presenting formed radial members simulating the spoke configuration of a machined cast aluminum wheel. The wheel cover is coupled to an annular retaining ring creating a wheel cover assembly that can be attached to an automobile steel wheel. The wheel cover is machined to resemble the appearance of a cast aluminum wheel, coated with a sealant, and decorated with a central logo.

Referring to FIG. 4, cast machined wheels 22 have become popular with automobile customers. Such wheels are typically an after market product which may embody various custom designs. Such wheels may be made or fabricated from cast aluminum or the like. The wheels may include a tire rim 43 secured to a central rim portion which is formed by a series of radial spokes 46 which form therebetween spoked apertures 48. Typically such spoke apertures diverge radially outwardly from a radially interior apex. The manufacturing method typically involves fabrication of a casting mold in which aluminum is casted to provide a wheel section which may be two or three inches or more thick. The finishing process typically involves a machining of the cast surfaces by a milling machine or the like which is operative to repeatedly pass a cutting bit over the wheel surface to perform the final contour and finished surface. The finished surface thus typically presents a series of concentric or fine spiral machine grooves which have become recognized by customers as a characteristic of machined cast wheels. Because of the quantity of metal required for the casting process and the labor intensive process of casting and machining the wheel, the cost of production is substantial thus leading to a relatively high sales price. The relative high cost of such cast wheels is such that they are beyond the reach of a great segment of the purchasing public. It is thus an object of the present invention to provide a relatively inexpensive wheel cover which can be snap fit onto conventional wheels to simulate the appearance of a relatively expensive custom machined wheel.

Referring to FIG. 5, in the method of the present invention, a two sided round blank 32 is cut from a stock sheet of aluminum alloy using a standard die set 36. The aluminum alloy stock is preferably 2 mm thick alloyed aluminum disks. The standard set may include a punch 38 and a press 40, formed with round cavity 42. The punch 38 is formed with a circular array of triangularly shaped punch elements 43 for punching respective triangular blanks 45 from the circular blank 32 to, with the blanking process, form relatively small window openings 50 (FIG. 6).

Referring to FIG. 7, the blank 32 with the window openings 50 formed therethrough is subjected to multiple shaping steps, as for instance a two step drawing operation. The blank 32 is stamped in a die set 52 corresponding to the configuration, shape, and appearance of the machined wheel 22 (FIG. 2) to be simulated. A second stage punch 54 and press 56 alter the dimensions of the blank 32 to press the metal further toward the desired shape. The drawing operation is accomplished in two steps having progressively deeper draws to gradually work the blank into the desired shape.

Press 56 is formed with a formed cavity 55 configured with a central bore 57 for receipt of a complementary punch pin 62 in the punch 54. The cavity 55 itself is generally circular with a raised central area defining a dome shape and having centrally raised ring 59 and tapering downwardly and outwardly to a peripheral ridge 61. Formed in a circular array about the cavity 55 is a plurality of triangular cavities 63 for complemental receipt of respective triangular punch elements 65.

Thus, when the punch 54 strikes the press 56 with the blank 32 in position, a the central punch pin 62 will be operative to punch a central hole 67 in the blank (FIG. 8) and the ring 59 will concurrently cooperate with the punch 54 to form a central ring 60 to define a circular central recess in the blank. The body of the blank will then curve in a direction generally radially outwardly and axially inwardly in a dome shape and to the outer ribs 64 where the annular curve 58 will be formed to define radially exteriorly thereof an annular flange 66. The punch element 65 will be further operative during this striking process to bend the borders about the periphery of the windows 50 downwardly as viewed in FIG. 7 to provide a downwardly and inward angle thereto, thus providing an initial forming which will eventually produce angular side borders 30 and 31 for each of the windows 50 which diverge radially outwardly to respective annular rim borders 33. It will be appreciated that this striking process and forming may be repeated in a progressive manner to the degree and extent required for the particular alloy thickness of metal heat treat and depth desired for the entire border of respective windows openings 50. This then serves to form the final windows 50' of the desired shape and size. The blank may then be struck again to establish a final trim for the finished shape of the window openings and to trim the periphery to the desired end size and circular configuration.

The next step is to crimp the marginal flange area of the blank onto a conventional retainer ring generally designated 26. For illustrative purposes, one procedure is shown in FIG. 9 and involves a press generally designated 69 having a cavity on which the blank may be positioned and formed with an upwardly raised radial ridge 71. The punch generally designated 73 is complementally formed and defines a female downwardly extending overhanging bead 74. Thus, the blank may be positioned in the press cavity with the curve 58 registered on the interior edge of the ridge 71 and, when struck with the punch, the flange 66 (FIG. 8) will be bent to form a cylindrically shaped retainer flange 70 oriented to, when the blank is viewed as the cover would be positioned on an automobile rim, project axially inwardly.

Figure 10:
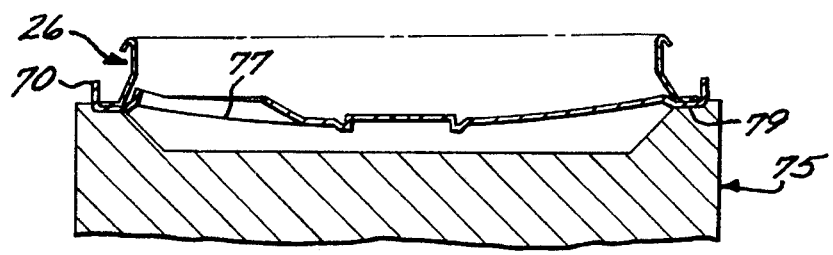
Figure 11:
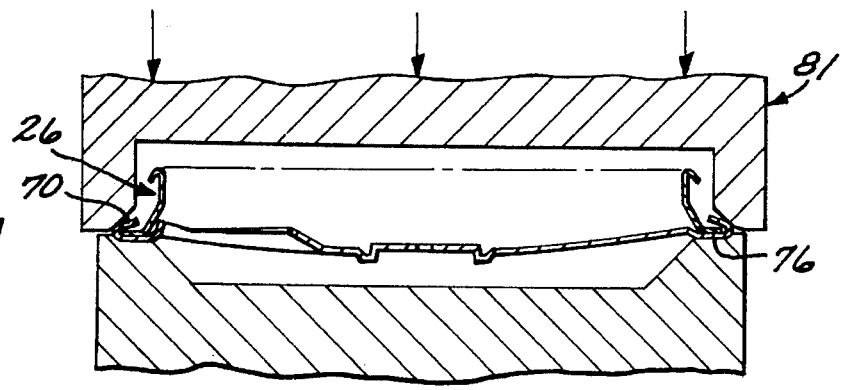

Referring to FIG. 10, a press generally designated 75 is provided with a cavity 77 configured at its radial extremities with an annular groove 79 for nesting thereonto of the radially outer extent of the partially formed blank. Thus, the blank may be inverted from the position shown in FIG. 9 and the retainer ring nested thereon within the confines of the retainer flange 70.

Figure 12:
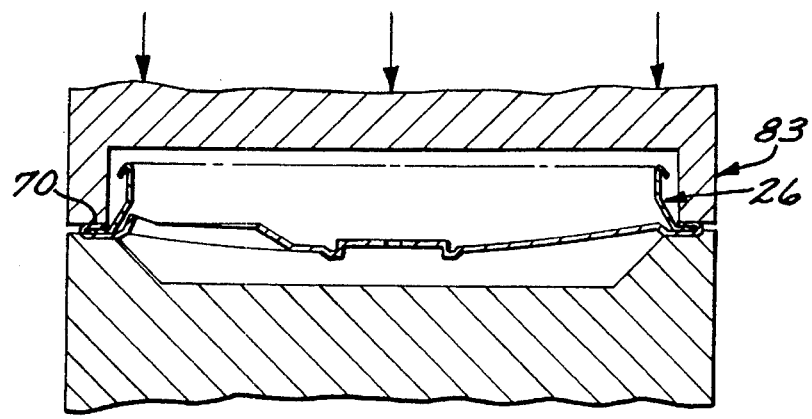

A cooperating punch, generally designated 81 is made to strike radial flange 70 and fold it radially inwardly over the retained flange 76 of the retainer ring 26. If necessary, the retainer flange 70 may be struck again with a second punch, generally designated 83, as shown in FIG. 12.

Thereafter, paint, sandblast, or other forms of applied coloration, 82 is sprayed or otherwise applied on the outer side 85 of the wheel cover assembly 20, as shown in FIG. 13, to add to its decorative appeal and to, when further processed provide shading to give an impression of depth.

Referring to FIG. 14, the wheel cover assembly 20 is then mounted on a machine tool 84. A computer numerically controlled ("CNC") lathe cutting tool 86 is then utilized to cut tiny spiral machine grooves 88, shown in FIG. 15, on the outer surface 85 of the wheel cover 24. Because the cover has already been formed to its desired shape, this machine etching may be accomplished in one pass of the lathe cutting tool 86. The CNC is programmed to operate the cutting tool so the detentes 28 (FIG. 4) and borders 30, 31, 33 (FIG. 8) around the windows 50 are preferably left unmachined, thus leaving the paint or other finish in place. This then leaves the borders 30, 31, 33 darker than other portions of the outer side surface 85 to cooperate in presenting the appearance of depth. The fine machine grooves 88 (FIG. 15) etched on the wheel cover cooperate with the inwardly opening borders 30, 31, 33 (FIG. 8) to simulate the appearance of the spokes 46 and openings 48 of the selected machined wrought wheel 22 (FIG. 4). After the machining operation, the wheel cover exhibits a texture 90 of spirals of fine machine groove lines, as shown in FIG. 16. These machine groove lines give the wheel cover assembly the appearance of the machine lines on a decorative wrought wheel.

Debris and metal shavings are removed from the surface of the wheel cover. The wheel cover assembly 20 is coated with a clear sealant. A logo plate 94 is mounted to the wheel cover assembly using a pressure sensitive adhesive.

In operation, the wheel cover assembly is mounted on an automobile by thrusting it into the exterior of an automotive steel wheel to thus stimulate a relatively expensive machined aluminum cast wheel. In addition to improving the appearance of the automobile, the improved wheel cover has beneficial functional attributes to the wheel.

It will be appreciated that the wheel cover assembly of the present invention may thus be conveniently installed on a conventional automobile wheel by merely snapping it into position. Even the most modest wheel will then exhibit the appearance of a relatively expensive cast machined wheel. Moreover, when the automobile is underway, the windows 50 in combination with the radially inwardly and converging lips defining the borders 30, 31, and 30 will serve to circulate air in heat exchange relationship with the rim to thereby facilitate dissipation of heat generated by, for instance, actuation of the automobile brakes. To this end, when the wheel cover 20 of FIG. 1 is rotated in, for instance, a clockwise direction, the leading lip 31 will tend to draw ambient air radially inwardly within the wheel cover (FIG. 4) and the trailing lip 30 will tend to exhaust hot air from the space between the cover and the rim to thereby enhance circulation of air. This feature compounds the cooling effect by the fact that air currents circulate from one window to the next and introduce a graphic flow of air thereby enhancing heat dissipation.

From the foregoing, it will be appreciated that the method of manufacturing the wheel cover of the present invention utilizes a relatively modest amount of metal and is not labor intensive. The forming process can be efficiently achieved on a production line basis and the machining process involves only a single pass of the cutting tool. All these features cooperate together in providing a relatively inexpensive wheel cover which persuasively simulates a more expensive machined wheel casting.

While a particular form of the invention has been illustrated and described, it will be apparent that various modifications can be made without departing from the spirit and scope of the invention.

What is claimed is:

1. A method of manufacturing a machined aluminum wheel cover assembly for covering a steel automobile wheel and comprising the steps of:

cutting a round piece from a stock of formable aluminum alloy sheet to form a cover blank having axially inner and outer sides;

selecting a spoke pattern simulating the radial spokes of a machined spoke wheel with radially outwardly diverging openings formed between said spokes;

choosing a die set including a punch assembly corresponding to said spoke pattern which define punch projections corresponding to the shape and locations of said respective radially outwardly diverging openings;

drawing said blank with said die set to form on said outer side axially inwardly projecting indentation lips defining spoke opening indentations in an arrangement and size corresponding with said spoke pattern thereby forming a front face on said outer side simulating the configuration of said radial spokes of said machined spoked wheel;

mounting said blank on a machine tool;

machining said outer side of said blank to simulate said machined wheel; and coupling an attachment ring to said inner side of said blank opposite said outer side.

2. A method of manufacturing as recited in claim 1, wherein:

said stock of aluminum alloy metal is of substantially uniform thickness.

3. A method of manufacturing as recited in claim 2 wherein said stock of metal is 2 millimeters thick.

4. A method of manufacturing as recited in claim 1 wherein:

said machining step comprises passing a lathe cutting tool in a progressive spiral pattern across said outer side of said blank closely following the contour of said blank to form fine machine groove lines on said outer side concentric about the center of said blank.

5. A method of manufacturing as recited in claim 4 wherein:

said passing step is performed not more than once.

6. A method of manufacturing as recited in claim 1 further comprising the step:

applying coloration to selected areas of said outer side of said blank to simulate contour and depth.

7. A method of manufacturing as recited in claim 1, further comprising:

cleaning said outer side of said blank.

8. A method of manufacturing as recited in claim 1 further comprising the step:

piercing said blank at locations corresponding with the location of said spoke openings to create windows through said blank in shapes to compliment the shape of said indentations.

9. A method of manufacturing as recited in claim 1 further comprising the step:

forming a marginal curb about the periphery of said blank to simulate the peripheral flange of the rim of said spoked wheel.

10. A method of manufacturing as recited in claim 9 further comprising the step:

machining said curb.

11. A method of manufacturing as recited in claim 1 for use with an attachment ring having an annular peripheral retention bead and that includes:

forming said blank with a peripheral retainer flange projecting axially inwardly and configured to surround said retention bead;

telescoping said attachment ring against said inner surface to nest within said peripheral retainer flange; and bending said peripheral retainer flange radially inwardly retaining said ring in place.

* * * * *